Sept. 1, 1925.

L. HOUGHTON

TREE JACK

Filed Aug. 4, 1924

1,552,161

Leland Houghton
INVENTOR

Frank Warren
ATTORNEY

Patented Sept. 1, 1925.

1,552,161

UNITED STATES PATENT OFFICE.

LELAND HOUGHTON, OF SEATTLE, WASHINGTON.

TREE JACK.

Application filed August 4, 1924. Serial No. 729,931.

*To all whom it may concern:*

Be it known that I, LELAND HOUGHTON, a citizen of the United States, residing at Seattle, in the county of King and State of Washington, have invented a certain new and useful Improvement in Tree Jacks, of which the following is a specification.

My invention relates to improvements in tree jacks and the object of my invention is to provide a tree jack that is adapted for use in skyline logging operations and which is of light weight and substantial construction and efficient in operation.

Another object is to provide a tree jack in which the cable is supported on an endless grooved link belt that operates upon rollers that are disposed within the tree jack.

Another object is to provide a tree jack in which the cable is supported on an endless grooved link belt that operates upon rollers that are disposed in curved formation within the tree jack, the links of which belt being curved to comply with the curvature formed by said rollers so as to afford an efficient support having antifriction features adapted to suport the cable when said cable is supporting heavy loads.

Other and more specific objects will be apparent from the following description taken in connection with the drawings.

Tree jacks of this nature are used extensively in skyline logging operations and are usually of the form of pulleys mounted in blocks which construction causes it to be very heavy due to the fact that the frame must be made large and massive to withstand the heavy loads and to the fact that a relatively large heavy pulley must be used to support the load and so that the cable will not be damaged by bending it too sharply in passing over the same. These tree jacks are used at high elevations on large spar trees and are very heavy and cumbersome to move around and difficult to secure in the proper elevated positions to the spar trees.

My invention makes possible a great reduction in the weight of tree jacks of this nature and yet provides a track surface of relatively large diameter over which the cable and link belt may pass.

I accomplish these objects by devices illustrated in the accompanying drawings, wherein—

Figure 1:
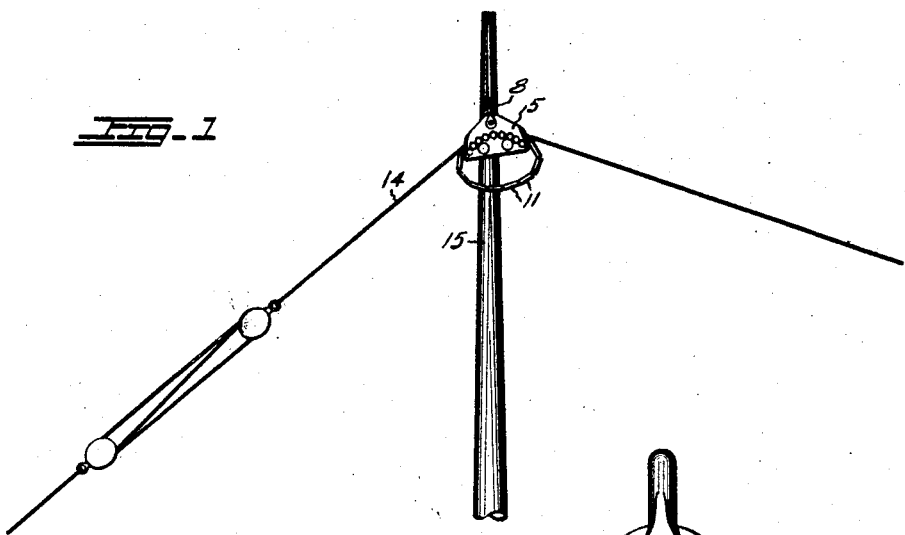
Figure 1 is a somewhat diagrammatic view in elevation illustrating the use of my tree jack on a spar tree.

Referring to the drawings, throughout which like reference numerals indicate like parts, the numerals 5 and 6 designate two spaced side plates of somewhat triangular configuration that are supported in spaced parallel relation by spacers 7 and are provided at their upper end with a connecting loop or hook 8. Extending crosswise in relatively close relation between the side plates 5 and 6 are a plurality of spaced bolts 9 upon which rollers 10 are rotatably mounted, the bolts 9 being arranged in the form of a curve or arc with its convex side normally uppermost.

A link belt formed of sections 11 articulated by pivots 12 and grooved as at 13 for the reception of a cable 14 is adapted to roll upon the rollers 10. The link belt formed of the sections 11 is long enough so that it hangs in a loop below the body of the tree jack.

In operation the cable 14 is passed through the tree jack between the side plates 5 and 6 so that it will rest upon the link belt and the jack is secured by any suitable means to the top of a spar tree 15 as shown in Fig. 1. When it is used in this manner the cable 14 will fit within the groove 13 in the link belt and the cable and belt will ride upon the rollers as on an ordinary pulley.

My tree jack is very much lighter in weight than the ordinary block and pulley due to the fact that the frame may be constructed lighter and that the pulley is entirely eliminated and my tree jack has been found to be very efficient in operation when the direction of the cable in passing over the jack is changed by an angle of less than ninety degrees.

Figure 3:
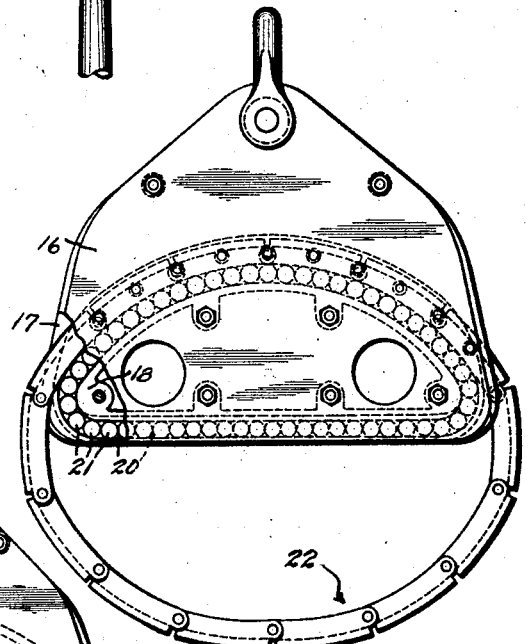
Fig. 3 is a view in side elevation with parts broken away of a modified form of my invention.
Figure 2:
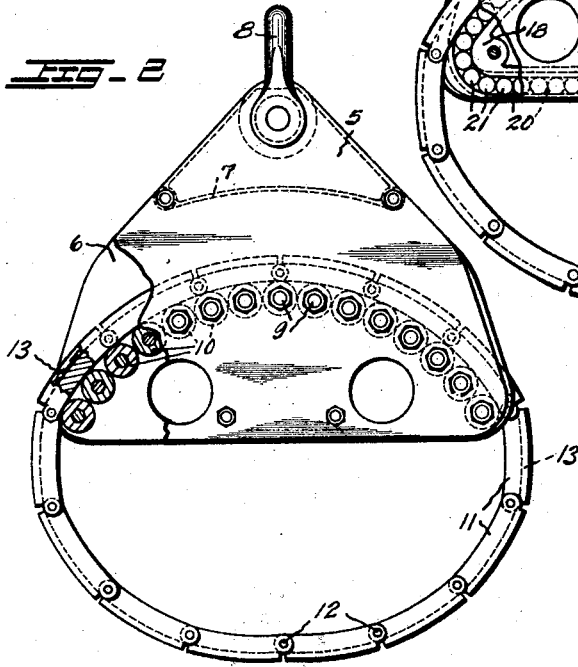
Fig. 2 is a view in side elevation with parts broken away showing a preferred construction of my invention.

In Fig. 3 I have shown a tree jack that differs slightly in construction from the tree jack shown in Fig. 2. This tree jack embodies two side plates 16 and 17 rigidly supported in relatively spaced parallel relation by a combined spacer and track member 18 and having a continuous trackway 20 within which a plurality of rollers 21 are freely disposed. A link belt 22 substantially identical with the link belt previously described in connection with Fig. 2 is arranged to run on the rollers 21 for receiving a cable as previously described.

In operation the tree jack is secured to a support, as to the top of the spar tree 15 and a cable 14 is passed thereover in such a manner as to make an angle or bend not in excess of ninety degrees. As the cable moves the link belt moves therewith and rolls upon the rollers 10 or 21 thus forming a very efficient carrying means for the cable and one that does not wear the cable. The rollers 21 in the structure shown in Fig. 3 travel around in the trackway 20 and offer very little frictional resistance to the movement of the link belt.

The foregoing description and accompanying drawings clearly disclose a preferred embodiment of my invention but it will be understood that this disclosure is merely illustrative and that numerous changes may be made in the structure within the scope and spirit of the invention.

What I claim is:

A tree jack embodying a frame, a plurality of rollers closely mounted in curved formation in said frame, and an endless link belt carried by said closely mounted rollers having a groove for the reception of a cable, the links of said belt being curved to comply with the curvature formed by said closely mounted rollers and said belt being adapted to hang in a loop below said frame.

In witness whereof, I hereunto subscribe my name this 29th day of July A. D. 1924.

LELAND HOUGHTON.